United States Patent
Prasse et al.

[11] Patent Number: 6,112,873
[45] Date of Patent: Sep. 5, 2000

[54] ANTI-BACKLASH DOG TYPE CLUTCH

[75] Inventors: Robert C. Prasse, Chicago; Anthony Lamela, Gilberts, both of Ill.

[73] Assignee: Case Corporation, Racine, Wis.

[21] Appl. No.: 09/309,101

[22] Filed: May 10, 1999

[51] Int. Cl.[7] .............................. F16D 11/14; F16D 23/00
[52] U.S. Cl. .................................. 192/69.83; 192/89.26; 192/91 A; 192/108
[58] Field of Search ........................ 192/69.82, 69.83, 192/89.26, 53.5, 91 A, 108, 71; 74/440

[56] References Cited

U.S. PATENT DOCUMENTS

| | | | |
|---|---|---|---|
| 390,886 | 10/1888 | Merriman | 192/53.5 X |
| 2,166,004 | 7/1939 | Hall | 192/108 X |
| 2,348,717 | 5/1944 | Banker | 192/69.83 |
| 2,416,083 | 2/1947 | Battaline | 192/69.83 |
| 3,679,032 | 7/1972 | Bennett | 192/91 A X |
| 3,880,267 | 4/1975 | Auble et al. | |
| 3,917,042 | 11/1975 | Summa | |
| 4,417,650 | 11/1983 | Geisthoff | 192/71 X |
| 4,671,129 | 6/1987 | Lovrenich | |
| 5,626,313 | 5/1997 | Davis | |

Primary Examiner—Rodney H. Bonck
Attorney, Agent, or Firm—Jansson, Shupe, Bridge & Munger, Ltd.

[57] ABSTRACT

A mechanical drive clutch is provided for mounting on a rotatable shaft. The drive clutch includes a drive gear having a plurality of gear teeth projecting therefrom. A sleeve is slidably mounted on the shaft for rotational movement therewith. The sleeve includes a plurality of gear engagement recesses therein of arcuate lengths greater than the predetermined arcuate lengths of the gear teeth. The sleeve is moveable between a first retracted position and a second engaged position wherein the gear teeth are received within corresponding gear engagement recesses in the sleeve in order to translate rotation of the drive gear to the shaft. A plurality of anti-backlash elements are provided to compensate for the difference in the arcuate lengths of gear teeth and their corresponding gear engagement recesses in the sleeve.

20 Claims, 4 Drawing Sheets

ANTI-BACKLASH DOG TYPE CLUTCH

BACKGROUND AND SUMMARY OF THE INVENTION

This invention relates generally to clutches, and in particular, to a mechanical drive clutch which reduces the backlash on forward and reverse shuttle operations.

Mechanical drive clutches are typically used to interconnect the transmission to the axle of a vehicle. There are two basic types of clutches, the friction clutch and the dog clutch. The friction clutch provides high performance at differential speed engagement with little or no noise during shuttle operations. However, friction clutches must be designed to hold full engine power through the clutch. As a result, the engagement of the plates must be modulated in some fashion in order to assure adequate plate life. Consequently, the costs associated with the design and manufacture of friction clutches are significantly greater than those associated with dog clutches.

A dog clutch typically includes a pair of jaws directed towards each other for connecting and disconnecting driving and driven parts, for example, in a motor vehicle between the engine and the transmission. When attempting to connect the driving and driven parts of a vehicle, the jaws of the dog clutch rotate until each tooth on one jaw finds a corresponding gap on the mating jaw. When the gap is found, the two jaws engage each other allowing power to be transmitted therethrough.

In order to allow the jaws to engage at differential speeds, the width of each jaw tooth on one jaw must be less than the corresponding gap or seat on the mating jaw. This gap is often referred to as the backlash in the dog clutch. During any forward or reverse shuttle, each jaw tooth must rotate through the corresponding gap to drive the forward side or to drive the reverse side of a corresponding tooth on the mating jaw. This free spin condition results in a load band when the jaw teeth on one jaw engage the forward or reverse side of the corresponding jaw teeth on the mating jaw. The noise associated with the load band is highly undesirable.

Therefore, it is a primary object and feature of the present invention to provide a dog clutch which greatly reduces or eliminates the backlash on forward and reverse shuttle operations.

It is a further object and feature of the present invention to provide a dog clutch which allows for engagement of mating jaws at various speeds.

It is a further object and feature of the present invention to provide a dog clutch which smoothly connects and disconnects the driving and driven parts of a vehicle.

It is a still further object and feature of the present invention to provide a dog clutch which is simple and inexpensive to manufacture.

In accordance with the present invention, a mechanical drive clutch for mounting on a rotatable shaft is provided. The clutch includes a drive gear rotatably received on the shaft. The drive gear has a plurality of gear teeth of a predetermined arcuate length which are circumferentially spaced about the shaft and which project in a first direction parallel to the longitudinal axis of the shaft. A sleeve is slidably mounted on the shaft for rotational movement therewith. The sleeve includes a plurality of gear engagement recesses therein of an arcuate length greater than the predetermined arcuate lengths of the gear teeth. The sleeve is movable between a first retracted position wherein the gear teeth are disengaged from the gearing engagement recesses and a second engaged position wherein each gear tooth is received within a corresponding gear engagement recess. plurality of anti-backlash elements are mounted within the sleeve and movable within between a first position wherein each of the anti-backlash elements extend into a corresponding gear engagement recess in order to compensate for the difference in the arcuate lengths of each gear tooth and its corresponding gear engagement recess, and a second retracted position.

The sleeve may include a plurality of pockets. Each pocket communicates with a corresponding gear engagement recess and slidably receives a corresponding anti-backlash element therein. A plate, axially spaced from the sleeve, is fixed to the shaft for rotational movement therewith. Springs are partially received within each corresponding pocket such that the first end of each spring engages the plate and a second end engages a corresponding anti-backlash element in a corresponding pocket so as to urge the anti-backlash element into a corresponding gear engagement recess. A biasing structure may also be provided for urging the sleeve into the retracted position.

It is contemplated that the drive gear be rotatable about the shaft and include a radially outer edge having a plurality of drive teeth thereon. It is also contemplated that each anti-backlash element terminate at a generally flat outer surface directed towards the drive gear and lying in a plane perpendicular to the longitudinal axis of the shaft. Each anti-backlash element may include a chamfered edge extending from the end surface thereof.

In accordance with a further aspect of the present invention, a mechanical drive clutch for mounting on a rotatable shaft is provided. The clutch includes a drive gear rotatably received on the shaft. The drive gear has a plurality of gear teeth circumferentially spaced about the shaft and projecting in a first direction parallel to a longitudinal axis of the shaft. A sleeve is slidably mounted on the shaft for rotational movement therewith. The sleeve includes a face surface directed towards the drive gear and a plurality of gear engagement recesses therein for receiving corresponding gear teeth. The sleeve is movable between a first retracted position wherein the gear teeth are disengaged from the gear engagement recesses and a second engaged position wherein each gear tooth is received within a corresponding gear engagement recess. A plurality of anti-backlash elements are slidably mounted within the sleeve and movable between a first position wherein each anti-backlash element extends into and partially fills a corresponding gear engagement recess and a second retracted position.

The sleeve may include a plurality of pockets. Each pocket communicates with the corresponding gear engagement recess and slidably receives a corresponding anti-backlash element therein. A plate, is affixed to the shaft for rotational movement therewith. A plurality of springs are partially received within corresponding pockets such that the first end of each spring engages the plate and the second end engages the corresponding anti-backlash element in the corresponding pocket so as to urge the anti-backlash element into a corresponding gear engagement recess. A biasing structure may also be provided for urging the sleeve into the retracted position.

It is contemplated that the drive gear include a radially outer edge having a plurality of drive teeth thereon. It is also contemplated that each anti-backlash element terminates at a generally flat outer surface directed towards the drive gear and lying in a plane perpendicular to the longitudinal axis to the shaft. Each anti-backlash element includes a chamfered edge extending from the outer surface thereof. In accordance with a still further aspect of the present invention, a clutch is provided for mounting on a rotational shaft extending on the longitudinal axis. The clutch includes a rotatable drive gear received on the shaft. The drive gear is driven about the shaft by an external source and has a gear tooth projecting therefrom in a direction parallel to the longitudinal axis. The gear tooth is defined by a leading surface and trailing surface interconnected by a face surface. A sleeve is slidably mounted on the shaft for translating rotation of drive gear to the shaft. The sleeve includes a gear engagement recess therein. The gear engagement recess is defined by a first tooth receiving portion and a second backlash portion. The sleeve is movable between a first retracted position wherein the gear tooth is disengaged from the gear engagement recess and a second engaged position wherein the gear tooth is received within a corresponding gear engaging recess. A pop-up jaw is mounted within the sleeve and movable between a first position wherein the pop-up jaw extends into the backlash portion of the gear engagement recess and a second retracted position.

It is contemplated that the sleeve includes a pop-up jaw retention structure for retaining a portion of the pop-up jaw therein. The sleeve also includes an inner surface which forms a slidable interface with the shaft and an outer peripheral surface. The hydraulic pressure source controls movement of the sleeve in the retracted and engaged position.

BRIEF DESCRIPTION OF THE DRAWINGS

The drawings furnished herewith illustrate a preferred construction of the present invention in which the above advantages and features are clearly disclosed as well as others which will be readily understood from the filing description of the illustrated embodiment.

In the drawings.

DETAILED DESCRIPTION OF THE DRAWINGS

Figure 1:
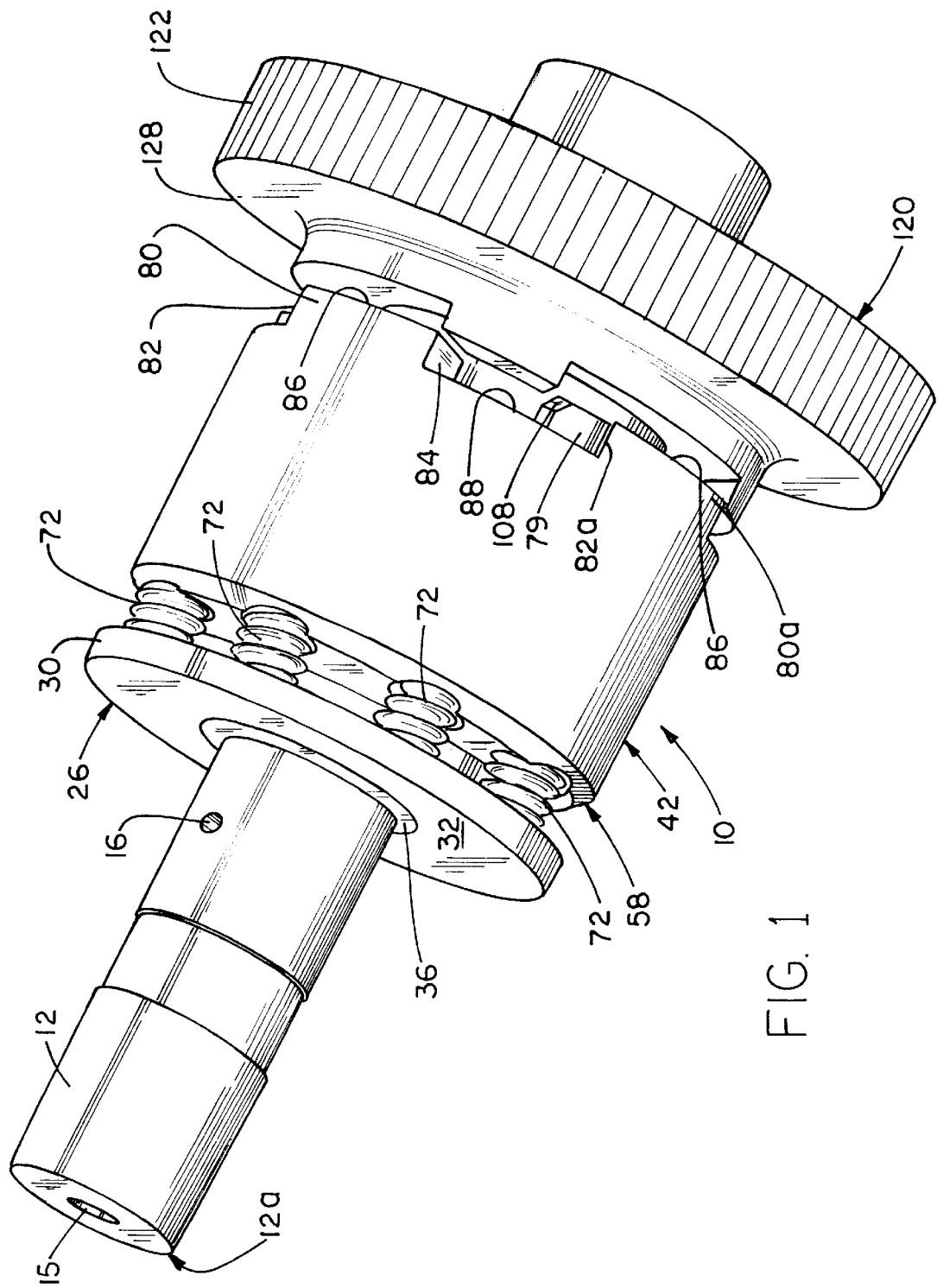
FIG. 1 is an isometric view of the mechanical drive clutch in accordance with the present invention in a first, disengaged condition.

Referring to FIG. 1, a mechanical drive clutch in accordance with the present invention is generally designated by the reference numeral 10. As is conventional, it is contemplated that clutch 10 be provided for connecting and disconnecting driving and driven parts, for example, between an engine and a transmission of a motor vehicle.

Figure 3:
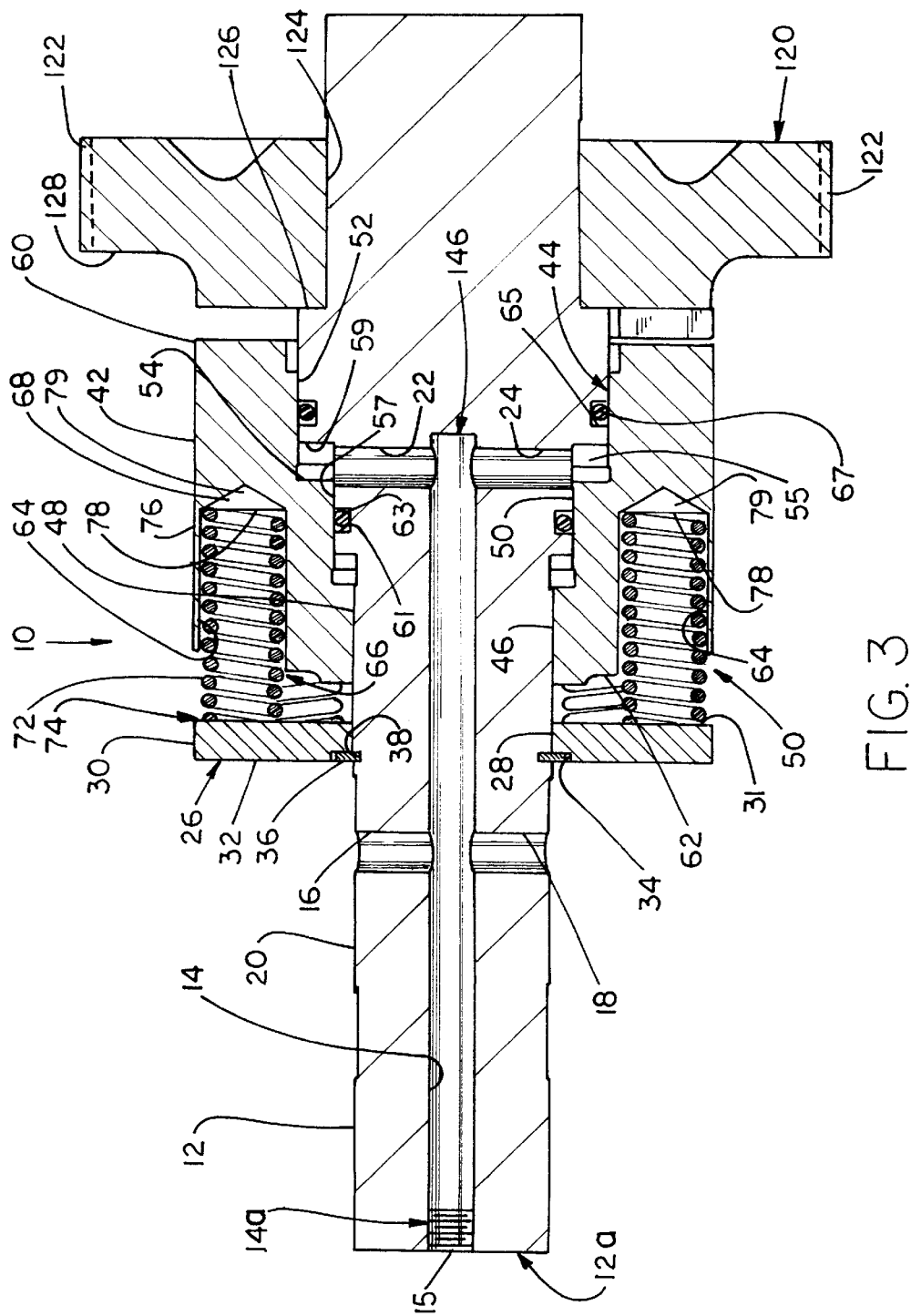
FIG. 3 is a cross sectional view of the mechanical drive clutch of FIG. 1.

Referring to FIG. 3, clutch 10 is positioned on a rotatable drive shaft 12. It is contemplated that drive shaft 12 be interconnected to the mechanical front drive axle of the vehicle. Drive shaft 12 extends along a longitudinal axis and includes a fluid passageway 14 which is coincident with the longitudinal axis of drive shaft 12. Drive shaft 12 further includes first and second fluid passages 16 and 18, respectively, which extend radially from the center of drive shaft 12 to the outer peripheral surface 20 thereof, and which communicate with fluid passageway 14 in shaft 12. It is contemplated to interconnect fluid passage 14 to a hydraulic fluid source (not shown) for reasons hereinafter described.

Drive shaft 12 further includes first and second ports 22 and 24, respectively, which extend radially from the center of drive shaft 12 to the outer peripheral surface 20 thereof and which communicate with a first end 14a of fluid passageway 14 in drive shaft 12. A second end 14b of fluid passageway is closed off by a plug 15 which is inserted into a first end 12a drive shaft 12.

Clutch 10 includes a generally disc-shaped support plate 26 having a radially inner edge 28 abutting the outer peripheral surface 20 of drive shaft 12 and a radially spaced outer edge 30. Alternatively, it is contemplated to spline the inner edge 28 of support plate 26 to the outer peripheral surface 20 of drive shaft 12 such that support plate 26 and drive shaft 12 travel in unison. Support plate 26 is defined by an inwardly directed face 31 and an outwardly directed face 32 having snap ring receipt depression 34 adjacent inner edge 28 thereof. As best seen in FIG. 3, a snap ring 36 is positioned within snap ring receiving depression 34 in outwardly directed face 32 of support plate 26 and is received in groove 38 in the outer peripheral surface 20 of drive shaft 12 so as to prevent longitudinal movement of support plate 26 along the outer peripheral surface 20 of drive shaft 12.

Clutch 10 further includes a generally cylindrical sleeve 42. Sleeve 42 includes a radially inner surface 44 which forms a slidable interface with the outer peripheral surface 20 of drive shaft 12. Radially inner surface 44 of sleeve 42 includes a splined portion 46 which forms a mating relationship with corresponding splines 48 on the outer peripheral surface 20 of drive shaft 12 such that drive shaft 12 and sleeve 42 rotate in unison about the longitudinal axis of drive shaft 12.

Radially inner surface 44 of sleeve 42 further includes a first, generally cylindrical sealing portion 50 and a second, generally cylindrical sealing portion 52. First and second sealing portions 50 and 52, respectively, of radially inner surface 44 of sleeve 42 are spaced by a radially extending forward bearing wall 54. Forward bearing wall 54 and sealing portion 52 of radially inner surface 44 partially define a fluid receipt cavity 55 within clutch 10.

Fluid receipt cavity 55 is further defined by a cavity defining portion 57 of outer peripheral surface 20 of drive shaft 12 and a stop portion 59 extending radially therefrom. Cavity defining portion 57 of outer peripheral surface 20 of drive shaft 12 includes a circumferentially extending groove 61 therein for receiving an O-ring 63 to prevent the flow of fluid therepast. Drive shaft 12 further includes a second circumferentially extending groove 65 in the outer peripheral surface 20 thereof to receive a second O-ring 67 therein. O-rings 63 and 67 retain fluid in fluid receipt cavity 55 and prevent such fluid from seeping out of fluid receipt cavity 55 within clutch 10 and along drive shaft 12 of clutch 10.

Sleeve 42 further includes first and second opposite ends 58 and 60, respectively. End 58 of sleeve 42 terminates at a generally circular face 62 having a plurality of circumferentially spaced pockets 64 extending therein. Each pocket 64 extends along a corresponding axis which is parallel to the longitudinal axis of drive shaft 12. In addition, each pocket includes a first open end 66 which opens to face 62 of sleeve 42 and second, opposite end 68. Each pocket 64 is adapted for receiving a corresponding compression spring 72 therein. Each compression spring includes a first end 74 which engages inwardly directed face 31 of support plate 26 and a second opposite end 76 which engages an inner end 78 of a corresponding anti-backlash element 79 as hereinafter described.

Second end 60 of sleeve 42 includes a plurality of circumferentially spaced gear teeth 80 which extend therefrom in a direction parallel to the longitudinal axis of drive shaft 12. Each gear tooth 80 includes first and second longitudinally extending side walls 82 and 84 interconnected by terminal face 86. Terminal face 86 of each gear tooth 80 has a predetermined arcuate length.

Figure 2:
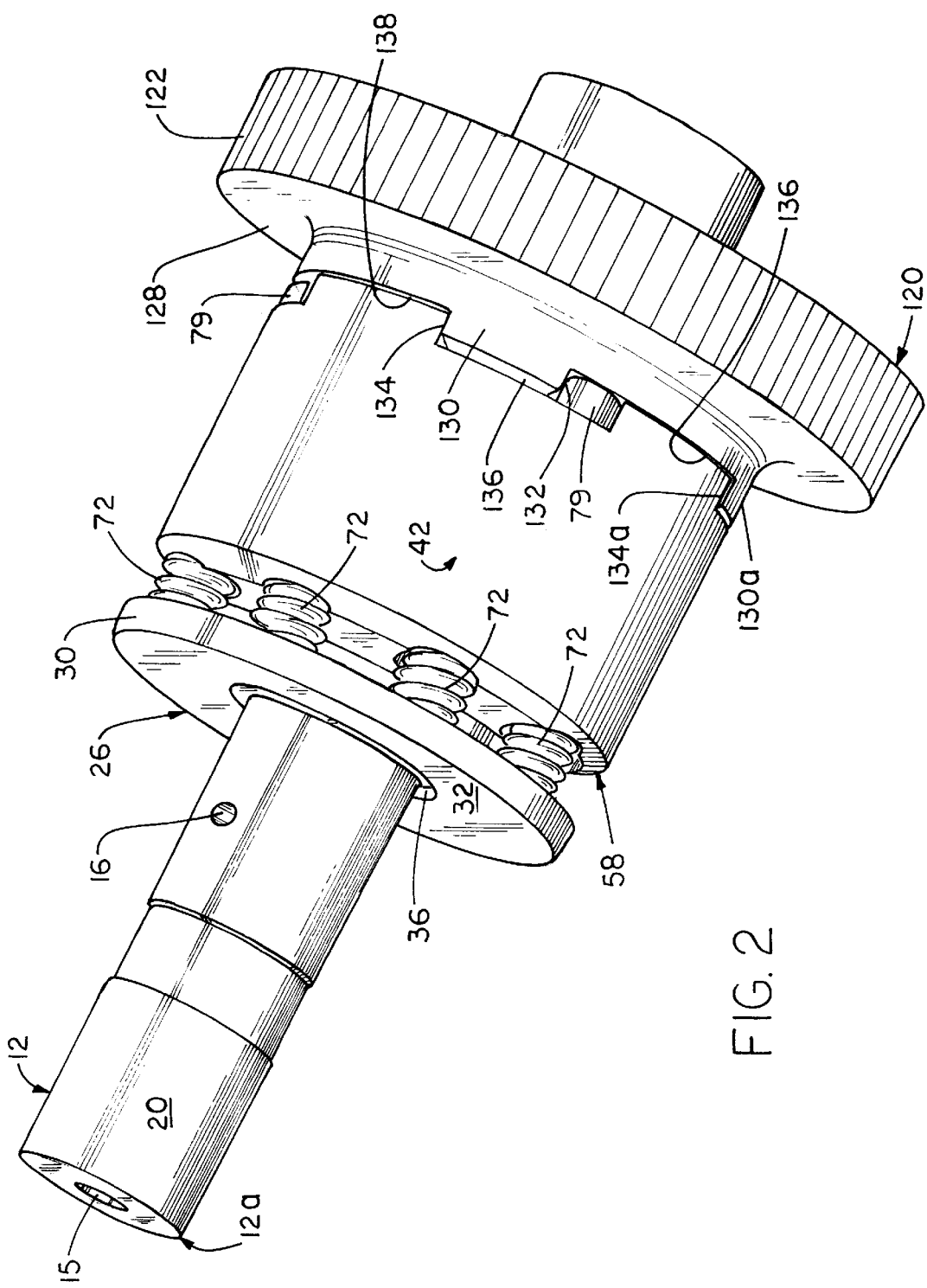
FIG. 2 is an isometric view of the mechanical drive clutch of FIG. 1 in a second, engaged condition.

As best seen in FIGS. 1 and 2, side wall 84 of each gear tooth 80 is separated from side wall 82a of an adjacent gear tooth 80a by a recessed face 88 having a predetermined arcuate length. As best seen in FIGS. 46, side wall 84 of gear tooth 80, recessed face 88, and side wall 82a of adjacent gear tooth 80a define a gap 90 therebetween. Each gap 90 communicates with the interior of a corresponding pocket 64 through opening 92 in recessed surface 88.

Each pocket 64 in sleeve 42 is defined by the generally cylindrical inner wall 96 which intersects recessed face 88 of a corresponding gap 90. A stop 98 extends between side wall 82 of each gear tooth 80 and inner surface 96 defining a corresponding pocket 64.

Each anti-backlash element 79 is generally cylindrical and includes an outer surface 98 which forms a slidable interface with the inner surface 96 of a corresponding pocket 64 in which it is received. Each anti-backlash element 79 includes a generally cylindrical tooth engaging head 100 of a reduced diameter projecting from the outer end 102 thereof. Each tooth engaging head 100 is defined by a generally cylindrical outer surface 104 which is interconnected to a generally-flat, tooth engaging surface 106 by a chamfered edge 108. Each anti-backlash element 79 further includes a stopping surface 110 which project radially from outer surface 104 of tooth engaging head 100 and intersects outer surface 98 thereof. With each anti-backlash element 79 received within a corresponding pocket 64 in sleeve 42, each stop 98 of sleeve 42 overlaps a portion of stopping surface 110 of a corresponding anti-backlash element 79 so as to retain anti-backlash elements 79 within corresponding pockets 64.

Clutch 10 further includes a drive gear generally designated by the reference numeral 120. Drive gear 120 includes a plurality of circumferentially-spaced teeth 122 about the outer periphery thereof. It is contemplated that teeth 122 mesh of drive gear 120 with corresponding teeth on a driving gear (not shown) in the transmission of the vehicle. Drive gear 120 further includes a radially inner surface 124 which forms a rotational interface with outer peripheral surface 20 of drive shaft 12. A shoulder 126 is formed in drive shaft 12 so as to prevent axial movement of drive gear 120 along the outer peripheral surface 20 of drive shaft 12, from left to right in FIG. 3.

Drive gear 120 also includes an inwardly directed face 128 directed towards sleeve 42. Face 128 includes a plurality of circumferentially-spaced teeth 130 projecting towards sleeve 42 in a direction parallel to the longitudinal axis of drive shaft 12. Each tooth 130 is defined by first and second longitudinally-extending sidewalls 132 and 134, respectively, interconnected by a terminal face 136. Terminal face 136 of each tooth 130 has a predetermined arcuate length which is less than the predetermined arcuate length of each recessed face 88 in sleeve 42.

As best seen in FIGS. 1 and 2, sidewalls 132 of teeth 130 is separated from sidewalls 134a of adjacent teeth 130a by recessed faces 138 having predetermined arcuate lengths greater than the sum of the arcuate lengths of terminal faces 86 of gear teeth 80 and the diameter of tooth engaging heads 100 of anti-backlash elements 79.

In operation, hydraulic fluid under pressure enters fluid passage 14 in drive shaft 12 through fluid passages 16 and 18. The hydraulic fluid flows through ports 22 and 24 into fluid receipt cavity 55. The pressure of hydraulic fluid in fluid receipt cavity 55 urges sleeve 42 against the bias of compression springs 72 so as to retract sleeve 42 into a first, disengaged position, FIG. 1.

With the sleeve 42 in its retracted position, drive gear 120 rotates freely about drive shaft 12. In order to translate rotation of drive gear 120 to drive shaft 12, clutch 10 is activated such that the fluid pressure in fluid receipt cavity 55 is reduced. As such, compression springs 72 bias anti-backlash elements 79, from left to right in FIG. 3, such that stopping surfaces 110 of backlash elements 79 engage corresponding stops 98 in sleeve 42 so as to urge sleeve 42 toward drive gear 12. As sleeve 42 is urged toward drive gear 120, teeth 130 of drive gear 120 attempt to locate corresponding gaps 90 between teeth 82 extending from sleeve 42 and teeth 82 projecting from drive gear 120 simaltaneously attempt to locate corresponding gaps 137 in drive gear 120, FIG. 4.

Figure 5:
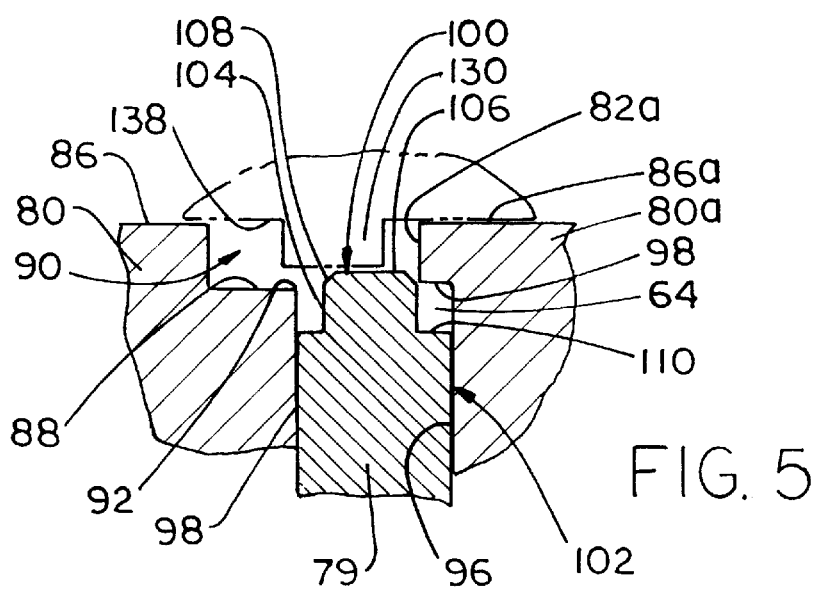
FIG. 5 is an enlarged, cross-sectional view of the mechanical drive clutch of the present invention showing engagement of the jaws of the mechanical drive clutch.

Referring to FIG. 5, if teeth 130 of drive gear 120 engage tooth engaging surfaces 106 of corresponding anti-backlash elements 79, anti-backlash elements 79 will be compressed into corresponding pockets 64 against the force of compression springs 72 and maintained therein. During the first forward or reverse shuttle, teeth 130 of drive gear 120 will travel along the arcuate length of corresponding recessed faces 88 in sleeve 42 such time that terminal faces 136 of teeth 130 disengage from corresponding tooth engaging surfaces 106 of anti-backlash elements 79. As a result, anti-backlash elements 79 are urged by corresponding springs 72 into their extended position, FIG. 6, so as to minimize gaps 90 in sleeve 42 and remove most of the backlash between sleeve 42 and drive gear 120.

Figure 6:
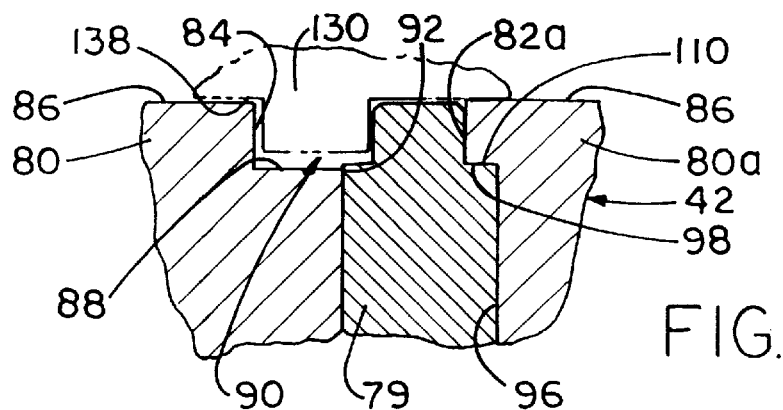
FIG. 6 is an enlarged, cross-sectional view of the mechanical drive clutch of the present invention showing the jaws of the mechanical drive clutch in an engaged condition.
Figure 4:
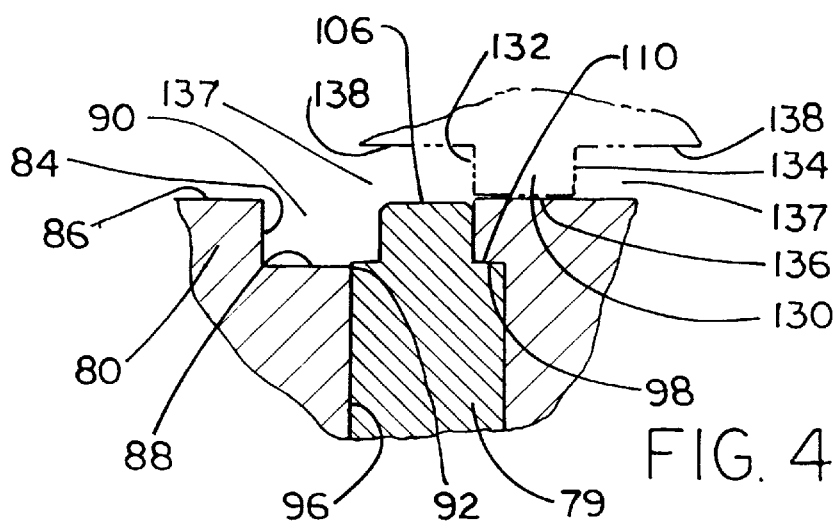
FIG. 4 is an enlarged, cross-sectional view of the mechanical drive clutch of the present invention showing the jaws of the mechanical drive clutch in a disengaged condition.

As best seen in FIGS. 4–6, the tooth engaging heads 100 of anti-backlash elements 79 may engage corresponding stops 98 in pockets 64 of sleeve 42 so as to prevent such anti-backlash element 79 from returning to its extended position, FIG. 6. As such, chamfered edges 108 are provided tooth engaging heads 100 of anti-backlash elements 79 in order to discourage such an occurrence and allow anti-backlash elements 79 to return to their extended position, FIG. 6.

As described, it is intended that clutch 10 will operate with little or no noise during forward or reverse shuttle operations. Further, since the arcuate lengths of gaps 90 in end 60 of sleeve 42 when anti-backlash elements 79 are in the retracted position, FIG. 5, are the same as in prior art clutches, the differential speed range for engagement of the clutch remains unaltered.

Various modes of carrying out the invention are contemplated as being within the scope of the following claims, particularly pointing out and distinctly claiming the subject matter regarded as the invention.

We claim:

1. A mechanical drive clutch for mounting on a rotatable shaft extending along a longitudinal axis, comprising:

a drive gear received on the shaft, the drive gear having a plurality of gear teeth of a predetermined arcuate length which are circumferentially spaced about the shaft and which project in a first direction parallel to the longitudinal axis;

a sleeve slidably mounted on the shaft for rotational movement therewith and having a plurality of gear engagement recesses therein of an arcuate length greater than the predetermined arcuate lengths of the gear teeth, the sleeve movable between a first retracted position wherein the gear teeth are disengaged from the gear engagement recesses and a second engaged position wherein each gear tooth is received within a corresponding gear engagement recess; and a plurality of anti-backlash elements mounted within the sleeve each anti-backlash element is independently movable between a first position wherein the anti-backlash elements extend into a corresponding gear engagement recess in order to compensate for the difference in the arcuate lengths of the gear teeth and their corresponding gear engagement recesses, and a second retracted position wherein the anti-backlash elements are received entirely within the sleeve.

2. The mechanical drive clutch of claim 1 further comprising a plate fixed to the shaft for rotational movement therewith.

3. The mechanical drive clutch of claim 2 wherein the sleeve includes a plurality of pockets, each pocket communicating with a corresponding gear engagement recess and slidably receiving a corresponding anti-backlash element therein.

4. The mechanical drive clutch of claim 3 further comprising a plurality of springs, each spring partially received within a corresponding pocket such that a first end of each spring engages the plate and a second end engages the anti-backlash element in the corresponding pocket so as to urge the anti-backlash element into a corresponding gear engagement recess.

5. The mechanical drive clutch of claim 1 further comprising biasing structure for urging the sleeve into the retracted position.

6. The mechanical drive clutch of claim 1 wherein the drive gear is rotatable about the shaft and includes a radially outer edge having a plurality of drive teeth thereon.

7. The mechanical drive clutch of claim 1 wherein each anti-backlash element terminates a generally flat outer surface directed towards the drive gear and lying in a plane perpendicular to the longitudinal axis of the shaft.

8. The mechanical drive clutch of claim 7 wherein each anti-backlash element includes a chamfered edge extending from the outer surface thereof at a predetermined angle greater than 90°.

9. A mechanical drive clutch for mounting on a rotatable shaft extending along a longitudinal axis, comprising:

a drive gear rotatably received on the shaft and having a plurality of gear teeth circumferentially spaced about the shaft that project in a first direction parallel to the longitudinal axis;

a sleeve slidably mounted on the shaft for rotational movement therewith, the sleeve including a face surface directed towards the drive gear and having a plurality of gear engagement recesses for receiving corresponding gear teeth therein, the sleeve movable between a first retracted position wherein the gear teeth are disengaged from the gear engagement recesses and a second engaged position wherein each gear tooth is received within a corresponding gear engagement recess; and a plurality of anti-backlash elements slidably mounted within the sleeves the anti-backlash elements independently movable between a first position the anti-backlash elements extend into and partially fills a corresponding gear engagement recess and a second retracted position wherein the anti-backlash elements are received entirely within the sleeve.

10. The mechanical drive clutch of claim 9 wherein the sleeve includes a plurality of pockets, each pocket communicating with a corresponding gear engagement recess and slidably receiving a corresponding anti-backlash element therein.

11. The mechanical drive clutch of claim 10 further comprising a plate fixed to the shaft for rotational movement therewith.

12. The mechanical drive clutch of claim 11 further comprising a plurality of springs, each spring partially received within a corresponding pocket such that a first end of each spring engages the plate and a second end engages the anti-backlash element in the corresponding pocket so as to urge the anti-backlash element into a corresponding gear engagement recess.

13. The mechanical drive clutch of claim 9 further comprising biasing structure for urging the sleeve into the retracted position.

14. The mechanical drive clutch of claim 9 wherein the drive gear includes a radially outer edge having a plurality of drive teeth thereon.

15. The mechanical drive clutch of claim 9 wherein each anti-backlash element terminates a generally flat outer surface directed towards the drive gear and lying in a plane perpendicular to the longitudinal axis of the shaft.

16. The mechanical drive clutch of claim 9 wherein each anti-backlash element includes a chamfered edge extending from the outer surface thereof.

17. A clutch for mounting on a rotatable shaft extending along a longitudinal axis, comprising:

a rotatable drive gear received on the shaft, the drive gear driven about the shaft by an external source and having a gear tooth projecting therefrom in a direction parallel to the longitudinal axis, the gear tooth defined by a leading surface and a trailing surface interconnected by a face surface;

a sleeve slidably mounted on the shaft for translating rotation of the drive gear to the shaft and including a gear engagement recess therein, the gear engagement recess being defined by a first tooth receiving portion and a second backlash portion, the sleeve movable between a first retracted position wherein the gear tooth is disengaged from the gear engagement recess and a second engaged position wherein the gear tooth is received within a corresponding gear engagement recess; and a pop-up jaw mounted within the sleeve and movable between a first position wherein the pop-up jaw extends into the backlash portion of the gear engagement recess and a second retracted position wherein the pop-up jaw is received entirely within the sleeve.

18. The clutch of claim 17 wherein the sleeve includes a pop-up jaw retention structure for retaining a portion of the pop-up jaw therein.

19. The clutch of claim 17 wherein the sleeve includes an inner surface which forms a slidable interface with the shaft and an outer peripheral surface.

20. The clutch of claim 17 further comprising a hydraulic pressure source for controlling movement of the sleeve between the retracted and engaged positions.

* * * * *

UNITED STATES PATENT AND TRADEMARK OFFICE
CERTIFICATE OF CORRECTION

PATENT NO. : 6,112,873
DATED : September 5, 2000
INVENTOR(S) : Robert C. Prasse and Anthony Lamela It is certified that error appears in the above-identified patent and that said Letters Patent are hereby corrected as shown below:

In column 2, line line 3, between "recess." and "plurality", insert --A--.
In column 5, line 21, cancel "46" and substitute therefor --4-6--.

Signed and Sealed this

Fifteenth Day of May, 2001

Attest:

NICHOLAS P. GODICI

Attesting Officer    Acting Director of the United States Patent and Trademark Office